# ALKOXYPENTENYL SULFONATES

Earl W. Lane, Philadelphia, and Warren D. Niederhauser, Huntingdon Valley, Pa., assignors to Rohm & Haas Company, Philadelphia, Pa., a corporation of Delaware No Drawing. Application July 13, 1954, Serial No. 443,157

14 Claims. (Cl. 260—513)

This invention relates to alkoxypentenyl sulfonates as new compositions of matter. It more particularly relates to the alkoxypentenyl sulfonates of sodium, potassium, ammonium, calcium, magnesium, and the like. It also relates to a method for the preparation of the alkoxypentenyl sulfonates.

The present invention is concerned with the preparation of alkoxypentenyl sulfonates by reacting the corresponding alkoxypentenyl chloride or bromide with a sulfite. The alkoxypentenyl sulfonates formed in this reaction may be represented by the formula $$(ROCH_2CH_2CH=CHCH_2SO_3)_nX$$

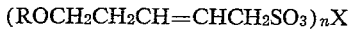

in which R is an alkyl group of eight to twenty carbon atoms, X is an inorganic cation such as sodium, potassium, ammonium, calcium, magnesium, or the like, and $n$ is an integer of one to two, having the same numerical value as the valance number of X. Typical of the members that may be employed as R are octyl, tert-octyl, nonyl, isononyl, decyl, tert-decyl, undecyl, dodecyl, isododecyl, tert-dodecyl, tetradecyl, hexadecyl, octadecyl, eicosyl groups and the like. As the members stated as suitable as X, sodium is somewhat preferred.

The present reaction is preferably carried out in an inert solvent medium, such as water, alcohol, or the like. Among the alcohols suitable for this use are ethanol, propanol, and isopropanol. Any compound that is a solvent for at least one of the reactants without reacting or otherwise interfering, i. e. inert, is considered to be satisfactory for this use. Generally, the alcohols act as solvents for the alkoxypentenyl chlorides and bromides, whereas water is a solvent for the sulfites. The use of water is somewhat preferred to the use of alcohol for at least two reasons. Water is, of course, cheaper and in addition to that advantage, it has been observed that an emulsion forms between water and the alkoxypentenyl chloride or bromide as the first portion of the product is formed. This condition apparently accelerates and facilitates the reaction and assures the progress of the reaction to completion. If desired, combinations of solvents, such as water and alcohol, may be employed so that both of the reactants may be in solution.

The reaction temperature is not particularly critical. Temperatures in the range of 50 to 250° C. or more have been determined as satisfactory, with the preferred range being 55 to 225° C. Of course, the reaction temperature is influenced by the boiling point of the solvent employed. Therefore, if a reaction temperature is contemplated appreciably above the boiling point of the solvent employed the system should be maintained under pressures greater than atmospheric. In this respect convenient pressures may be employed up to about 250 pounds per square inch. It is somewhat preferred that the reaction be conducted under suitable pressures up to about 200 pounds per square inch.

The time of reaction is not critical and generally varies according to the temperature, pressures, solvents, and specific reactants involved. Usually the reaction is essentially completed in an hour or two, although longer periods of time are frequently employed to assure reaction completion. If desired, the completion of the reaction can be determined by titration procedures. Since the reaction produces, as a necessary by-product, an ionizable chloride whose quantitative amounts can be determined by titration methods, such as the Volhard method, an indication of reaction completion may be obtained. However, as a matter of convenience, instead of obtaining an indication of reaction completion by titration or other methods, the reaction is usually run for a period of time somewhat longer than that contemplated for the completion of the reaction in order to assure a substantially quantitative result.

The molar ratios of the reactants is maintained at essentially a one-to-one level with the sulfite usually present in slight excess. The reaction occurs between the reactants in a one-to-one ratio to yield substantially quantitative result without the need of additional catalytic impetus. The products formed, the alkoxypentenyl sulfonates, are compounds of pronounced surface activity, being particularly advantageous as detergents. They are especially suited for applications in which stable foams at elevated temperature are desired. As detergents, the present products may be used with builders such as sodium tripolyphosphate, carbonates, borates, silicates, and the like to give highly satisfactory results.

At the conclusion of the reaction the product, alkoxypentenyl sulfonate, is separated by an alcohol-water extraction. If water has been employed originally as the solvent for the reactants, an alcohol, such as ethanol, propanol, isopropanol, or the like, is added to the reaction mixture. If an alcohol has been used originally as the solvent for the reactants, then water is added to the reaction mixture. The product is soluble in hot alcohol and can therefore be readily extracted from the chloride by-product which remains dissolved in the water. The product is then obtained by stripping off the alcohol or by cooling the alcohol solution. The product, on cooling, precipitates from the alcohol solution. If desired, the product may be recrystallized from hot alcohol.

The starting compounds of the instant method, the alkoxypentenyl chlorides or bromides, can be prepared by reacting the corresponding alkoxymethyl chloride or bromide with butadiene in the presence of a Friedel-Crafts catalyst. The other compounds, the sulfites, are well known and for the present reaction should have an inorganic cation such as sodium, potassium, ammonium, calcium, magnesium, or the like.

The method of preparing the alkoxypentenyl sulfonates, in accordance with the present invention is shown in the following illustrative examples in which parts by weight are used throughout.

Example 1

There were introduced into a reaction vessel 105 parts of decoxypentenyl chloride, 72 parts of potassium sulfite, and 125 parts of water. The mixture was stirred and the temperature was increased to 150 to 160° C. at a pressure of about 120 pounds per square inch. At the end of three and a half hours the system was returned to atmospheric pressure and 500 parts of hot isopropanol was added to the reaction mixture. The isopropanol solution was washed with hot heptane, filtered, and then cooled. The product crystallized from the isopropanol. It was taken up in hot isopropanol, filtered, cooled, filtered out and then identified as potassium decoxypentenyl sulfonate.

Example 2

To a reaction vessel there were added 116 parts of dodecoxypentenyl chloride, 63 parts of sodium sulfite, and 150 parts of water. The temperature of the reaction mixture was raised to and maintained at 160 to 170° C. for about four hours. The system was maintained under a pressure of about 125 pounds per square inch. During the reaction period the mixture was stirred. At the conclusion of the reaction the system was returned to atmospheric pressure and 500 parts of hot isopropanol added to the reaction mixture. The isopropanol was washed with hot heptane and then evaporated to dryness. The product was taken up in 80% isopropanol, filtered, and the isopropanol removed by stripping. The product gave a sulfated ash of 20.6% (19.8% theoretical) and was identified as sodium dodecoxypentenyl sulfonate.

*Example 3*

A mixture of 127 parts of tetradecoxypentenyl chloride, 60 parts of sodium sulfite, and 150 parts of water was added to a reaction vessel and stirred. The temperature was adjusted at 160 to 175° C. and the system was maintained under a pressure of 120 pounds per square inch. At the end of about four hours the system was returned to atmospheric pressure and 500 parts of hot isopropanol was added to the reaction mixture. The isopropanol was washed with hot heptane and then evaporated to dryness. The product was taken up in 80% isopropanol, filtered, and the isopropanol removed by stripping. The product gave a sulfated ash of 18.7% (18.5% theoretical) and was identified as sodium tetradecoxypentenyl sulfonate.

*Example 4*

There were added to a reaction vessel 138 parts of hexadecoxypentenyl chloride, 56 parts of sodium sulfite, and 150 parts of water. The mixture was stirred and then heated until the temperature reached 160 to 170° C. The temperature was maintained at that level and the pressure of the system was adjusted to 120 pounds per square inch. The reaction was continued for a period of about four hours. At the conclusion of the reaction period the system was returned to atmospheric pressure and 500 parts of hot isopropanol was added to the reaction mixture. Hot heptane was used to wash the hot isopropanol solution. The isopropanol solution was filtered and then allowed to cool. The product crystallized and was dried. The product gave a sulfated ash of 19.8% (17.5% theoretical) and was identified as sodium hexadecoxypentenyl sulfonate.

*Example 5*

There were introduced into a reaction vessel 178 parts of eicosoxypentenyl bromide, 58 parts of ammonium sulfite, and 150 parts of water. The mixture was stirred and heated until the temperature reached 175 to 185° C. The system was maintained at a pressure of 135 to 140 pounds per square inch. The reaction was continued for about five hours at the end of which time the system was returned to atmospheric pressure. There was added to the reaction mixture 500 parts of hot isopropanol. The isopropanol was washed with hot heptane, filtered, and cooled. The product crystallized from the isopropanol solution and was separated by filtration. The product was dried and then identified as ammonium eicosoxypentenyl sulfonate.

*Example 6*

To a reaction vessel there were added 111 parts of octoxypentenyl bromide, 60 parts of calcium sulfite, and 150 parts of water. The mixture was stirred then heated until the temperature reached 145 to 155° C. The temperature was maintained at that level and the pressure of the system was adjusted to 150 pounds per square inch. The reaction was continued for a period of about six hours at the end of which time the system was returned to atmospheric pressure. Hot isopropanol, in the amount of 500 parts, was added to the reaction mixture. The isopropanol solution was washed with hot heptane, filtered, and then cooled. The product crystallized as the isopropanol solution was cooled. It was identified as calcium octoxypentenyl sulfonate.

In a similar manner there was produced magnesium octoxypentenyl sulfonate from octoxypentenyl chloride and magnesium sulfite.

We claim:

1. A method for preparing an alkoxypentene sulfonate which comprises reacting the corresponding alkoxypentenyl halide, having the formula

ROCH₂CH₂CH=CHCH₂R' in which R is an alkyl group of eight to twenty carbon atoms and R' is a halogen having an atomic weight of 35.5 to 79.9, with a sulfite, having an inorganic cation, in an inert solvent medium.

2. A method for preparing an alkoxypentene sulfonate which comprises reacting, at a temperature of 50 to 250° C. and pressures up to 250 pounds per square inch, the corresponding alkoxypentenyl halide, having the formula ROCH₂CH₂CH=CHCH₂R', in which R is an alkyl group of eight to twenty carbon atoms and R' is a halogen having an atomic weight of 35.5 to 79.9, with a sulfite having an inorganic cation of a molecular weight of 18 to 40, in an inert solvent medium.

3. A method for preparing an alkoxypentene sulfonate which comprises reacting, at a temperature of 55 to 225° C. and pressures greater than atmospheric up to 200 pounds per square inch, the corresponding alkoxypentenyl halide, having the formula ROCH₂CH₂CH=CHCH₂R', in which R is an alkyl group of eight to twenty carbon atoms and R' is a halogen having an atomic weight of 35.5 to 79.9, with a sulfite having an inorganic cation of a molecular weight of 18 to 40, in an inert solvent medium.

4. A method for preparing an alkoxypentene sulfonate which comprises reacting, at a temperature of 55 to 225° C. and pressures greater than atmospheric up to 200 pounds per square inch, the corresponding alkoxypentenyl chloride having the formula ROCH₂CH₂CH=CHCH₂Cl, in which R is an alkyl group of eight to twenty carbon atoms, with sodium sulfite in an aqueous medium, and separating the product.

5. A method for preparing sodium tetradecoxypentene sulfonate which comprises reacting, at a temperature of 55 to 225° C. and pressures greater than atmospheric up to 200 pounds per square inch, C₁₄H₂₉OCH₂CH₂CH=CHCH₂Cl with sodium sulfite in an aqueous medium, and separating the product.

6. A method for preparing sodium hexadecoxypentene sulfonate which comprises reacting, at a temperature of 55 to 225° C. and pressures greater than atmospheric up to 200 pounds per square inch, C₁₆H₃₃OCH₂CH₂CH=CHCH₂Cl with sodium sulfite in an aqueous medium, and separating the product.

7. A method for preparing sodium dodecoxypentene sulfonate which comprises reacting, at a temperature of 55 to 225° C. and pressures greater than atmospheric up to 200 pounds per square inch, C₁₂H₂₅OCH₂CH₂CH=CHCH₂Cl with sodium sulfite in an aqueous medium, and separating the product.

8. As new compositions of matter compounds having the formula ROCH₂CH₂CH=CHCH₂SO₃R', in which R is an alkyl group of eight to twenty carbon atoms and R' is an inorganic cation.

9. As new compositions of matter compounds having the formula ROCH₂CH₂CH=CHCH₂SO₃R', in which R is an alkyl group of eight to twenty carbon atoms and R' is an inorganic cation having a molecular weight of 18 to 40.

10. As a new composition of matter
$$C_{12}H_{25}OCH_2CH_2CH=CHCH_2SO_3Na$$

11. As a new composition of matter
$$C_{14}H_{29}OCH_2CH_2CH=CHCH_2SO_3Na$$

12. As a new composition of matter
$$C_{16}H_{33}OCH_2CH_2CH=CHCH_2SO_3Na$$

13. As a new composition of matter
$$C_{12}H_{25}OCH_2CH_2CH=CHCH_2SO_3K$$

14. As a new composition of matter
$$C_{14}H_{29}OCH_2CH_2CH=CHCH_2SO_3NH_4$$

References Cited in the file of this patent

UNITED STATES PATENTS

| | | |
|---|---|---|
| 2,278,064 | Simo et al. | Mar. 31, 1942 |
| 2,316,847 | Dreyfus | Apr. 20, 1943 |
| 2,535,677 | Hollander et al. | Dec. 26, 1950 |